(12) United States Patent
Satou et al.

(10) Patent No.: US 6,211,939 B1
(45) Date of Patent: Apr. 3, 2001

(54) LIQUID CRYSTAL DISPLAY AND METHOD OF DRIVING LIQUID CRYSTAL DISPLAY

(75) Inventors: Masaki Satou; Kazumi Kobayashi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/359,429

(22) Filed: Jul. 22, 1999

(30) Foreign Application Priority Data

Jul. 23, 1998 (JP) .................................................. 10-207736

(51) Int. Cl.$^7$ ....................................................... G02F 1/13
(52) U.S. Cl. ............................................. 349/192; 349/123
(58) Field of Search ................................... 349/123, 124, 349/192

(56) References Cited

U.S. PATENT DOCUMENTS 5,696,568 * 12/1997 yamamoto et al. ................... 349/136

6,008,874 * 12/1999 Kouno et al. ......................... 349/123

FOREIGN PATENT DOCUMENTS

| 2-134620 | 5/1990 | (JP) . |
| 5-27261 | 2/1993 | (JP) . |
| H5-265046 | 10/1993 | (JP) . |
| H7-64096 | 3/1995 | (JP) . |

* cited by examiner

Primary Examiner—James A. Dudek

(57) ABSTRACT

There is provided a liquid crystal display including (a) a liquid crystal layer, (b) substrates sandwiching the liquid crystal layer therebetween, and (c) pixels arranged in a matrix on at least one of the substrates, an angle φ formed by steps on formed on an inner surface of the substrates with which the liquid crystal layer makes contact, an interval M between the steps, a height H of the steps, and a pre-tilt angle θ of liquid crystal in the liquid crystal layer, being controlled so that the following equation is established.

$$(H/M) \times (\phi/\theta) \leq 0.018$$

The liquid crystal display prevents display defect caused by steps formed on inner surfaces of substrates.

12 Claims, 3 Drawing Sheets

LIQUID CRYSTAL DISPLAY AND METHOD OF DRIVING LIQUID CRYSTAL DISPLAY

BACKGROUND OF THE INVENTION

1. Field of the Invention

The invention relates to a liquid crystal display, and more particularly to a liquid crystal display which is capable of preventing display defect caused by steps formed on inner surfaces of substrates. The invention relates also to a method of preventing display defect caused by alignment defect in a liquid crystal display.

2. Description of the Related Art

There has been widely used a twist nematic (TN) type liquid crystal display.

FIG. 1 illustrates a structure of a conventional liquid crystal display. The illustrated liquid crystal display is comprised of a lower substrate 5, an upper substrate (not illustrated) joined to the lower substrate 5 with a certain space being kept therebetween, and a liquid crystal layer 1 sandwiched between the lower substrate 5 and the upper substrate.

As illustrated in FIG. 1, an interlayer insulating film 4, a pixel electrode film 3, and an insulating film 2 are deposited on the lower substrate 5 in this order.

There are formed a lot of steps on inner surfaces of the lower and upper substrates with which the liquid crystal layer 1 makes contact. In particular, steps of the insulating film 2 formed on an inner surface of the lower substrate 5 cause reverse tilt and reverse twist which often extend to a display area of a liquid crystal display to thereby cause display defect with the result of deterioration in quality of images.

Since alignment treatment such as rubbing is conducted along steps formed on inner surfaces of the substrates, the liquid crystal layer 1 is put in reverse tilt condition in an inclined portion B which is shaded in a direction A in which alignment treatment is conducted. As a result, there occurs such display defect as mentioned above.

A lot of solutions to such a problem have been suggested so far.

The first solution is to form a film on inner surfaces of substrates by overcoating to thereby eliminate steps or flatten inner surfaces.

However, this solution is accompanied with a problem of deterioration in lead time caused by additional fabrication steps, and a problem of an increase in fabrication cost.

The second solution is to increase a pre-tilt angle θ).

However, it is generally difficult to make a pre-tilt angle θ greater than an angle φ of steps. Hence, it is quite difficult or almost impossible to prevent occurrence of the area B in which alignment is defective.

In addition, as a liquid crystal display has been fabricated smaller in size, an interval M between adjacent steps has become smaller. Hence, it is no longer possible to prevent occurrence of the area B only by making a pre-tilt angle θ greater.

Japanese Unexamined Patent Publication No. 5-265046 has suggested a liquid crystal display in which a side by which a pre-tilt angle of liquid crystal molecules can be obtained, among adjacent two sides of a pixel electrode, and the other side by which a pre-tilt angle in a reverse direction can be obtained are arranged in certain positions to thereby prevent alignment defect in liquid crystal.

Japanese Unexamined Patent Publication No. 7-64096 has suggested a liquid crystal display in which a pre-tilt direction is controlled so that a direction in which liquid crystal molecules are oriented by electric field running in a thickness-wise direction of a liquid crystal layer is common to a direction in which liquid crystal molecules are oriented by electric field, to thereby prevent deterioration in display quality.

However, the liquid crystal displays suggested in the above-mentioned Publications attempt to prevent alignment defect in liquid crystal by controlling a pre-tilt angle as a sole parameter. Hence, for the same reason as mentioned earlier, the suggested liquid crystal displays could not prevent occurrence of the area B.

SUMMARY OF THE INVENTION

In view of the above-mentioned problem, it is an object of the present invention to provide a liquid crystal display which is capable of preventing display defect caused by steps formed on inner surfaces of substrates. It is also an object of the present invention to provide a method of preventing display defect caused by alignment defect in a liquid crystal display.

In one aspect, there is provided a liquid crystal display including (a) a liquid crystal layer, (b) substrates sandwiching the liquid crystal layer therebetween, and (c) pixels arranged in a matrix on at least one of the substrates, display defect caused by alignment defect being prevented by controlling parameters including (a) an angle formed by steps formed on an inner surface of the substrates with which the liquid crystal layer makes contact, (b) an interval between the steps, (c) a height of the steps, and (d) a pre-tilt angle of liquid crystal in the liquid crystal layer.

In the liquid crystal display in accordance with the present invention, there are specified parameters with which display defect occurs due to steps formed on inner surfaces of upper and lower substrates, and such parameters are appropriately controlled to thereby prevent occurrence of display defect.

That is, the inventors have studied mechanism by which display defect occurred, and found out that the parameters with which display defect occurred due to steps formed on inner surfaces of upper and lower substrates were as follows: (a) an angle formed by steps formed on an inner surface of the substrates with which the liquid crystal layer makes contact; (b) an interval between the steps; (c) a height of the steps; and (d) a pre-tilt angle of liquid crystal in the liquid crystal layer. The liquid crystal display in accordance with the present invention controls these four parameters to thereby prevent display defect caused by alignment defect.

There is further provided a liquid crystal display including (a) a liquid crystal layer, (b) substrates sandwiching the liquid crystal layer therebetween, and (c) pixels arranged in a matrix on at least one of the substrates, an angle φ formed by steps on formed on an inner surface of the substrates with which the liquid crystal layer makes contact, an interval M between the steps, a height H of the steps, and a pre-tilt angle θ of liquid crystal in the liquid crystal layer, being controlled so that the following equation is established.

$$(H/M) \times (\phi/\theta) \leq 0.018 \qquad (A)$$

In the liquid crystal display, there are specified parameters with which display defect occurs due to steps formed on inner surfaces of upper and lower substrates, and there is also specified a relation among the parameters, and such parameters are appropriately controlled to thereby prevent occurrence of display defect.

In accordance with the study of the inventors, the parameters with which display defect occurs due to steps formed on inner surfaces of upper and lower substrates are as follows: (a) an angle formed by steps formed on an inner surface of the substrates with which the liquid crystal layer makes contact; (b) an interval between the steps; (c) a height of the steps; and (d) a pre-tilt angle of liquid crystal in the liquid crystal layer. The liquid crystal display in accordance with the present invention controls these four parameters in accordance with the above-mentioned equation (A), to thereby prevent display defect caused by alignment defect.

A function of the liquid crystal display in accordance with the present invention is explained hereinbelow with reference to FIG. 1.

As mentioned earlier, steps of the insulating film 2 formed on an inner surface of the lower substrate 5 cause the area B above the steps, in which alignment of liquid crystal is defective. In the area B that is shaded in a direction A in which alignment treatment such as rubbing is carried out, liquid crystals are oriented in accordance with inclination of a step. Since a step angle $\phi$ is generally greater than a pre-tilt angle $\theta$ of liquid crystal in the liquid crystal layer 1, the liquid crystal located above the step is apparently in reverse tilt condition.

Accordingly, liquid crystals in the area B are in reverse twist condition, and thus, there is generated disclination at an interface between the area B and an area C in which liquid crystals are properly aligned. If the left side in the above-mentioned equation (A) is greater than 0.018, an area having a length equal to the interval M and starting from the area B is entirely put in reverse twist condition. Thus, there occurs display defect.

The liquid crystal display in accordance with the present invention is designed to have a structure which satisfies the equation (A), and thus, makes it possible to suppress the above-mentioned disclination which occurs over a display area. The liquid crystal display in accordance with the present invention suppresses display defect by controlling all parameters with which display defect is caused, unlike prior art which attempts to suppress display defect by controlling a sole parameter such as a pre-tile angle.

In another aspect of the present invention, there is provided a method of preventing display defect caused by alignment defect in a liquid crystal display, including the step of controlling parameters including (a) an angle formed by steps formed on an inner surface of the substrates with which the liquid crystal layer makes contact, (b) an interval between the steps, (c) a height of the steps, and (d) a pre-tilt angle of liquid crystal in the liquid crystal layer.

There is further provided a method of preventing display defect caused by alignment defect in a liquid crystal display, including the step of controlling an angle $\phi$ formed by steps on formed on an inner surface of the substrates with which the liquid crystal layer makes contact, an interval M between the steps, a height H of the steps, and a pre-tilt angle $\theta$ of liquid crystal in the liquid crystal layer so that the following equation is established.

$$(H/M) \times (\phi/\theta) \leq 0.018 \quad (A)$$

The liquid crystal display may be of active matrix type or simple matrix type.

The advantages obtained by the aforementioned present invention will be described hereinbelow.

In accordance with the present invention, it is possible to suppress disclination occurring at steps formed on inner surfaces of upper and lower substrates. Hence, it is possible to prevent display defect which will be increased as a liquid crystal display is fabricated in a smaller size.

The present invention specifies parameters by which disclination occurs at steps formed on inner surfaces of substrates, and further specifies a relation among the parameters in figures. As a result, it is possible to prevent an area where alignment is defective from extending to an area where alignment is non- defective. Hence, the present invention is applicable to various structures of a liquid crystal display.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 2:
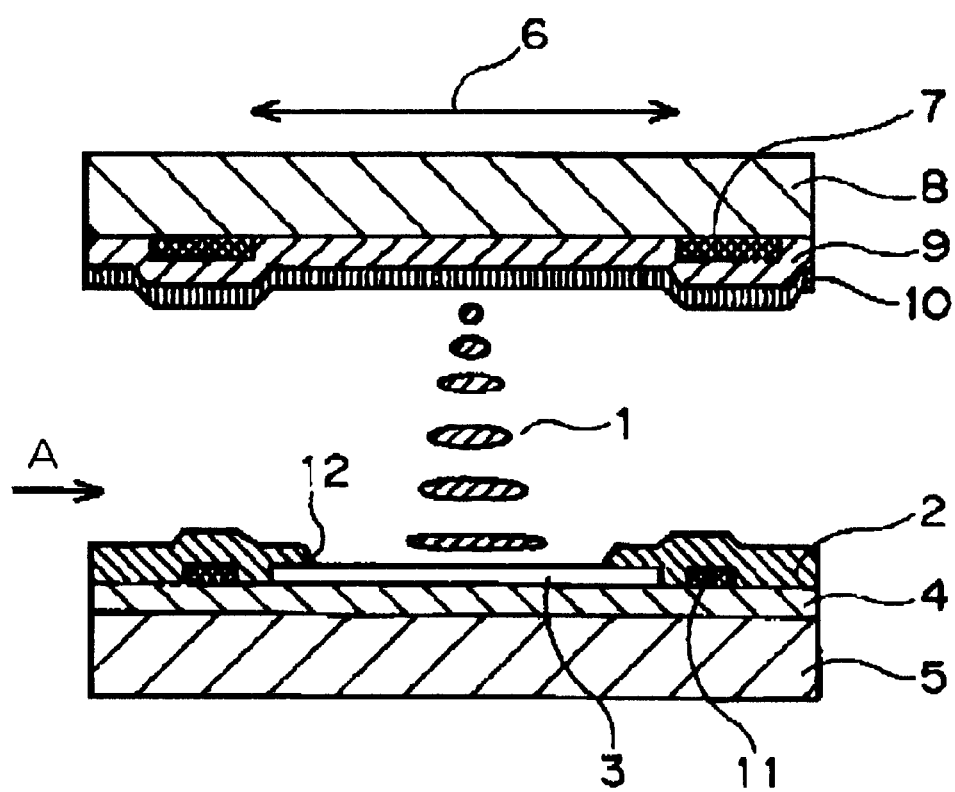
FIG. 2 is a cross-sectional view of a liquid crystal display in accordance with an embodiment of the present invention.

FIG. 2 is a cross-sectional view of a liquid crystal display in accordance with an embodiment of the present invention. The liquid crystal display in accordance with the embodiment is of active matrix type.

The liquid crystal display has a panel structure comprised of a lower substrate 5, an upper substrate 8 joined to the lower substrate 5 with a certain space being kept therebetween, and a liquid crystal layer 1 sandwiched between the lower and upper substrates 5 and 8.

A switching element (not illustrated) or a wiring layer is formed on the lower substrate 5. Liquid crystal in the liquid crystal layer 1 is oriented in twist nematic. The panel structure is designed to have a plurality of pixels 6 arranged in a matrix.

A light-impermeable black matrix film 7 is formed on an inner surface of the upper substrate 8 with which the liquid crystal layer 1 makes contact. The black matrix film 7 is patterned along boundaries among the pixels 6. A colored layer 9, a common electrode film 10, and an alignment film are deposited over the black matrix film 7. Since the alignment film is quite thin, specifically, has a thickness of about 500 angstroms, it is not illustrated in FIG. 2.

An interlayer insulating film 4 is formed on an inner surface of the lower substrate 5 with which the liquid crystal layer 1 makes contact. A patterned pixel electrode film 3 is formed on the interlayer insulating film 4. The patterned pixel electrode film 3 faces the common electrode film 10 edged by the black matrix film 7, and defines the pixels 6 arranged in a matrix.

A drain wiring layer 11 is formed on the interlayer insulating film 4 in facing relation with the black matrix film 7. The drain wiring layer 11 is covered with an insulating film 2 and an alignment film (not illustrated).

As illustrated in FIG. 2, steps 12 are formed on an inner surface of the lower substrate 5 with which the liquid crystal layer 1 makes contact. The steps 12 are formed as a result of etching of the insulating film 2. The alignment film is aligned in accordance with the steps 12, to thereby accomplish twist nematic.

Hereinbelow are explained parts constituting the liquid crystal display in accordance with the embodiment.

The upper substrate is composed of transparent material such as glass.

The black matrix film 7 is comprised of a light-impermeable metal film such as chromium and aluminum, and formed by sputtering and photolithography steps. As an alternative, the black matrix film 7 may be formed of a combination of resin such as acrylic resin and light-impermeable material such as carbon particles, by spin-coating and photolithography steps. In order to provide sufficient light-impermeability, the black matrix film 7 is designed to have a thickness in the range of 0.15 μm to 0.20 μm when the black matrix film 7 is comprised of a metal film, or a thickness in the range of 0.3 μm to 1.0 μm when the black matrix film 7 is comprised of a resin film.

The colored layer 9 is formed on an inner surface of the upper substrate 8, when display is to be colored. A transparent, electrically conductive film is formed over the colored layer 9. In the embodiment, the common electrode film 10 composed of ITO is formed over the colored layer 9 by sputtering.

As an uppermost layer, the alignment film composed of organic material such as polyimide is formed on the common electrode film 10. The alignment film is subject to alignment treatment such as rubbing in order to align liquid crystal in the liquid crystal layer 1.

The lower substrate 5 is composed of transparent material such as glass, similarly to the upper substrate 8. The interlayer insulating film 4 having a two-layered structure comprising a silicon dioxide layer and a silicon nitride layer is formed on an inner surface of the lower substrate 5 by chemical vapor deposition (CVD).

The pixel electrode film 3, the drain wiring layer 11, and a thin film switching element (not illustrated) are formed on the interlayer insulating film 4. The pixel element film 3 and the drain wiring layer 11 have a single-layered or multi-layered structure comprising metal layers such as Cr and ITO, and are formed by sputtering and photolithography steps. The pixel electrode film 3 has a thickness of about 0.03 μm, and the drain wiring layer 11 has a thickness in the range of 0.3 μm to 0.6 5 μm.

The insulating film 2 covers a portion of the pixel electrode film 3, the interlayer insulating film 4, and the drain wiring layer 11 therewith. The insulating film 2 is composed of silicon nitride, and is formed by CVD. The insulating film 2 is removed by etching in an area associated with the pixel 6. As a result, the steps 12 are formed on an inner surface of the lower substrate 5 with which the liquid crystal layer 1 makes contact.

Figure 1:
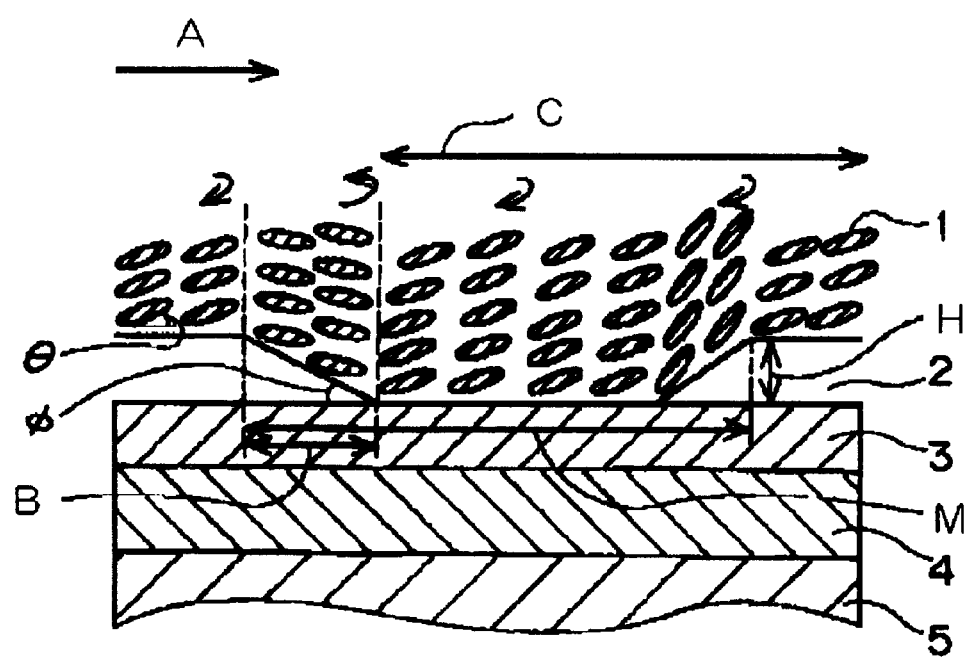
FIG. 1 is a cross-sectional view of a conventional liquid crystal display.

As illustrated in FIG. 1, the steps 12 can be defined with three parameters, that is, the step angle φ, the interval M between the steps 12, and a height H of the steps 12.

The alignment film (not illustrated) is formed on the insulating film 2, as an uppermost film, in order to align liquid crystal in the liquid crystal layer 1. The alignment film is subject to alignment treatment such as rubbing. Then, the upper and lower substrates 8 and 5 are spaced away from each other in parallel so that planes of the alignment films face each other. Then, a space formed between the upper and lower substrates 8 and 5 is filled with liquid crystal to thereby form the liquid crystal layer 1.

A pre-tilt angle θ is defined as an angle formed between the alignment film and liquid crystal in the liquid crystal layer 1. The step angle φ is generally greater than the pre-tilt angle θ, resulting in that there is generated the area B in which alignment is defective. As mentioned below, the liquid crystal display in accordance with the embodiment controls the four parameters, that is, the step angle φ, the interval M, the height H, and the pre-tilt angle θ to thereby prevent that the area B in which alignment is defective extends into the area C in which alignment is non-defective. Thus, it is possible to prevent occurrence of display defect.

The inventors conducted the experiment in which there had been fabricated a lot of liquid crystal displays in which the step angle φ, the interval M, the height H, and the pre-tilt angle θ were varied, and it was monitored as to how a rate with which display defect occurred varied.

The result of the experiment is shown in Table 1.

TABLE 1

| Examples | Parameters | | | | (A) × 100 | Rate (%) |
| | θ | φ | M | H | | |
|---|---|---|---|---|---|---|
| 1 | 2 | 20 | 88 | 0.4 | 4.55 | 100 |
|   | 3 | 20 | 88 | 0.4 | 3.03 | 80 |
|   | 4 | 20 | 88 | 0.4 | 2.27 | 50 |
|   | 5 | 20 | 88 | 0.4 | 1.82 | 0 |
| 2 | 5 | 23 | 88 | 0.2 | 1.05 | 0 |
|   | 5 | 45 | 88 | 0.2 | 2.05 | 30 |
|   | 5 | 75 | 88 | 0.2 | 3.41 | 100 |
| 3 | 5 | 20 | 67 | 0.4 | 2.39 | 60 |
|   | 5 | 20 | 88 | 0.4 | 1.82 | 0 |
|   | 5 | 20 | 93 | 0.4 | 1.72 | 0 |
| 4 | 5 | 20 | 88 | 0.2 | 0.91 | 0 |
|   | 5 | 20 | 88 | 0.5 | 2.27 | 50 |
|   | 5 | 20 | 88 | 0.6 | 2.73 | 70 |

In Table 1, "(A)×100" indicates a solution of the equation (A) multiplied by 100. "Rate (%)" indicates a rate at which display defect occurs in the unit of percentage.

In Example 1, the pre-tilt angle θ was varied as a variable, and the other parameters were fixed. The pre-tilt angle θ may be varied by changing liquid crystal or an alignment film.

In Example 1, the rate became smaller as the pre-tilt angle θ was set greater, resulting in that it was possible to prevent the area B in which alignment was defective, from extending.

In Example 1, the rate was equal to zero when the left side in the equation (A) was equal to or smaller than 0.0182.

In Example 2, the step angle φ was varied as a variable, and the other parameters were fixed. The step angle φ may be varied by changing conditions for etching the insulating film 2.

In Example 2, the rate became smaller as the step angle (was set smaller, resulting in that it was possible to prevent the area B in which alignment was defective, from extending.

In Example 2, the rate was equal to zero when the left side in the equation (A) is equal to or smaller than 0.0105.

In Example 3, the interval M between the steps was varied as a variable, and the other parameters were fixed. The interval M may be varied by changing a pixel density.

In Example 3, the rate was equal to zero when the left side in the equation (A) is equal to or smaller than 0.0182.

The greater interval M more efficiently suppresses the area B from extending into the area C.

In Example 4, the height H was varied as a variable, and the other parameters were fixed. The height H may be varied by changing a thickness of the insulating film 2.

In Example 4, the rate became smaller as the height H was set smaller, resulting in that it was possible to prevent the area B in which alignment was defective, from extending.

In Example 4, the rate was equal to zero when the left side in the equation (A) is equal to or smaller than 0.0091.

Figure 3:
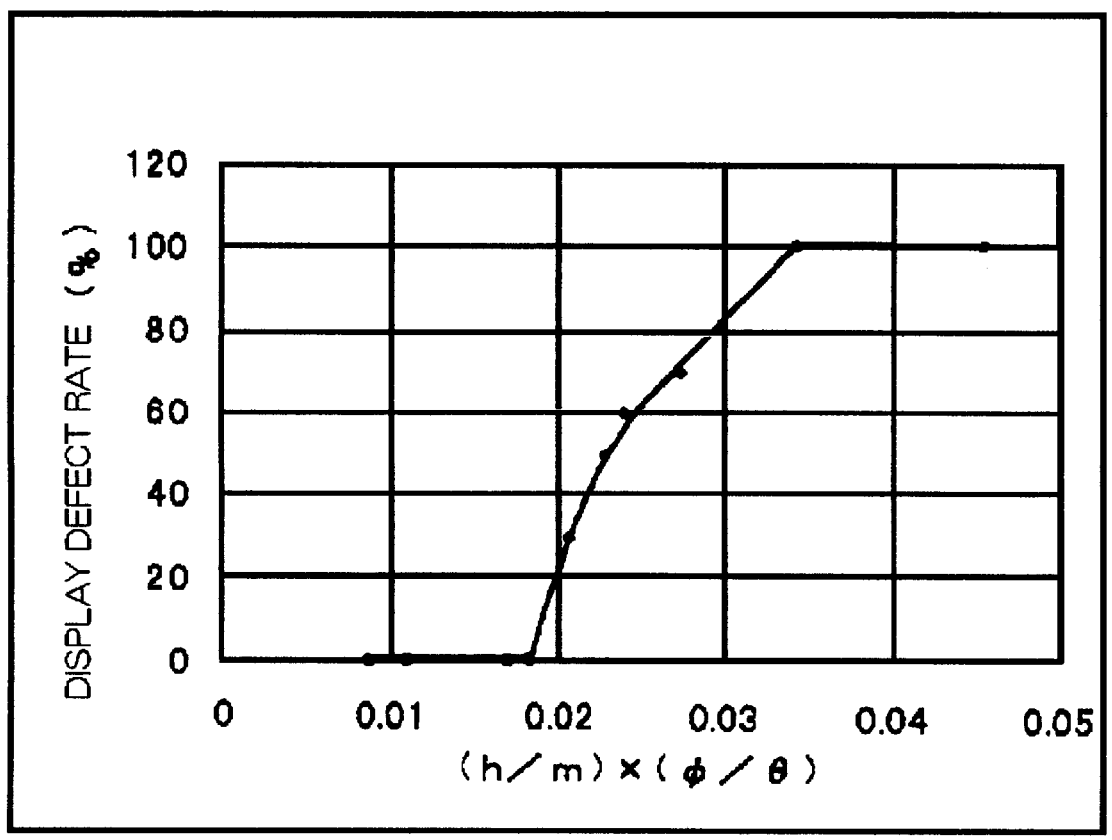
FIG. 3 is a graph showing a rate at which display defect occurs in a liquid crystal display in accordance with an embodiment of the present invention.

FIG. 3 illustrates the result shown in Table 1. As is obvious in view of FIG. 3, it would be possible to prevent the area B from extending into the area C by setting the left side of the equation (A) to be equal to or smaller than 0.018, resulting in that it is possible to prevent display defect.

As will be obvious in view of Examples 1 to 4, the rate is dependent on the four parameters included in the equation (A), that is, the step angle φ, the interval M, the step height H, and the pre-tilt angle θ of liquid crystal. In addition, these four parameters are independent of one another, and hence, can be controllable independently of one another. Accordingly, it is possible to control these four parameters for preventing display defect, in accordance with a structure of a liquid crystal display.

Hereinbelow is explained influence which the four parameters exert on the area B above the steps.

The area B in which alignment is defective is quite unstable relative to the area C in which alignment is non-defective. When the step angle φ and the step height H exceed the pre-tilt angle θ and the interval M by a certain degree, an area of the pixels 6 located between the steps 12 is put into reverse twist condition, starting from the area B, with the result of occurrence of display defect. The above-mentioned equation (A) is an indication for suppressing the area B, and it would be possible to efficiently reduce display defect by designing a liquid crystal display to have a structure defined by the equation (A).

In the instant embodiment, the liquid crystal display is designed to be of active matrix type. However, it should be noted that the present invention can be applied to any type of a liquid crystal display. For instance, the present invention may be applied to a simple matrix type liquid crystal display in which the common electrode film 10 formed on the upper substrate 8 is patterned as columns, and the pixel electrode film 3 formed on the lower substrate 5 is patterned as rows, and the pixels 6 are arranged at intersections of the columns and rows.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-207736 filed on Jul. 23, 1998 including specification, claims, drawings and summary is incorporated herein by reference in its entirety.

What is claimed is:

1. A liquid crystal display comprising:

(a) a liquid crystal layer;

(b) substrates sandwiching said liquid crystal layer therebetween; and (c) pixels arranged in a matrix on at least one of said substrates, display defect caused by alignment defect being prevented by controlling parameters including (a) an angle formed by steps formed on an inner surface of said substrates with which said liquid crystal layer makes contact, (b) an interval between said steps, (c) a height of said steps, and (d) a pre-tilt angle of liquid crystal in said liquid crystal layer.

2. The liquid crystal display as set forth in claim 1, wherein said liquid crystal display is of active matrix type.

3. The liquid crystal display as set forth in claim 1, wherein said liquid crystal display is of simple matrix type.

4. A liquid crystal display comprising:

(a) a liquid crystal layer;

(b) substrates sandwiching said liquid crystal layer therebetween; and (c) pixels arranged in a matrix on at least one of said substrates, an angle φ formed by steps on formed on an inner surface of said substrates with which said liquid crystal layer makes contact, an interval M between said steps, a height H of said steps, and a pre-tilt angle θ of liquid crystal in said liquid crystal layer, being controlled so that the following equation is established:

$$(H/M) \times (\phi/\theta) \leq 0.018.$$

5. The liquid crystal display as set forth in claim 4, wherein said liquid crystal display is of active matrix type.

6. The liquid crystal display as set forth in claim 4, wherein said liquid crystal display is of simple matrix type.

7. A method of preventing display defect caused by alignment defect in a liquid crystal display, comprising the step of controlling parameters including (a) an angle formed by steps formed on an inner surface of said substrates with which said liquid crystal layer makes contact, (b) an interval between said steps, (c) a height of said steps, and (d) a pre-tilt angle of liquid crystal in said liquid crystal layer.

8. The method as set forth in claim 7, wherein said liquid crystal display is of active matrix type.

9. The method as set forth in claim 7, wherein said liquid crystal display is of simple matrix type.

10. A method of preventing display defect caused by alignment defect in a liquid crystal display, comprising the step of controlling an angle φ formed by steps on formed on an inner surface of said substrates with which said liquid crystal layer makes contact, an interval M between said steps, a height H of said steps, and a pre-tilt angle θ of liquid crystal in said liquid crystal layer so that the following equation is established.

$$(H/M) \times (\phi/\theta) \leq 0.018.$$

11. The method as set forth in claim 10, wherein said liquid crystal display is of active matrix type.

12. The method as set forth in claim 10, wherein said liquid crystal display is of simple matrix type.

* * * * *